United States Patent
Izumi

(10) Patent No.: US 8,682,157 B2
(45) Date of Patent: Mar. 25, 2014

(54) OPTICAL COMMUNICATION SYSTEM, OPTICAL RECEIVING TERMINAL, AND OPTICAL SIGNAL FAULT DETECTION METHOD

(75) Inventor: Futoshi Izumi, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 695 days.

(21) Appl. No.: 12/691,817

(22) Filed: Jan. 22, 2010

(65) Prior Publication Data

US 2010/0142940 A1   Jun. 10, 2010

Related U.S. Application Data

(63) Continuation of application No. PCT/JP2007/065813, filed on Aug. 13, 2007.

(51) Int. Cl.
H04B 10/00 (2013.01)
H04B 10/08 (2011.01)

(52) U.S. Cl.
USPC ............ 398/5; 398/1; 398/2; 398/9; 398/17

(58) Field of Classification Search
USPC ............... 398/1–10, 17, 25, 30, 31, 38
See application file for complete search history.

(56) References Cited

U.S. PATENT DOCUMENTS

| | | | |
|---|---|---|---|
| 6,771,904 B1 | 8/2004 | Sasaki et al. | |
| 7,558,479 B1* | 7/2009 | Robinson | 398/28 |
| 2002/0101631 A1* | 8/2002 | Gerstel et al. | 359/110 |
| 2004/0247312 A1 | 12/2004 | Hasuo et al. | |
| 2005/0158057 A1* | 7/2005 | Tomofuji et al. | 398/160 |
| 2006/0133803 A1* | 6/2006 | Tian et al. | 398/4 |
| 2006/0188253 A1* | 8/2006 | Shimada et al. | 398/31 |

FOREIGN PATENT DOCUMENTS

| | | |
|---|---|---|
| JP | 2001-244900 | 9/2001 |
| JP | 2005-204026 | 7/2005 |
| WO | 03/049330 | 6/2003 |
| WO | 2005/008924 | 1/2005 |

OTHER PUBLICATIONS

International Search Report for PCT/JP2007/065813, mailed on Oct. 30, 2007.
Japanese Office Action mailed Mar. 27, 2012 issued in corresponding Japanese Patent Application No. 2009-527995.

* cited by examiner

*Primary Examiner* — Daniel Dobson
(74) *Attorney, Agent, or Firm* — Staas & Halsey LLP

(57) ABSTRACT

An optical communication system includes an optical transmission terminal including a first transmitter for transmitting an optical signal, and a second transmitter for transmitting information that indicates the first transmitter transmitting the optical signal; and an optical receiving terminal including an optical receiver for receiving the optical signal and the information transmitted from the first and second transmitter, respectively, a storage device for storing a power value of the optical signal monitored in response to receipt of the information transmitted from the second transmitter, and a fault detector for detecting fault of the optical signal by continuously monitoring a power value of the optical signal received by the optical receiver in comparison with the power value stored in the storage device.

11 Claims, 12 Drawing Sheets

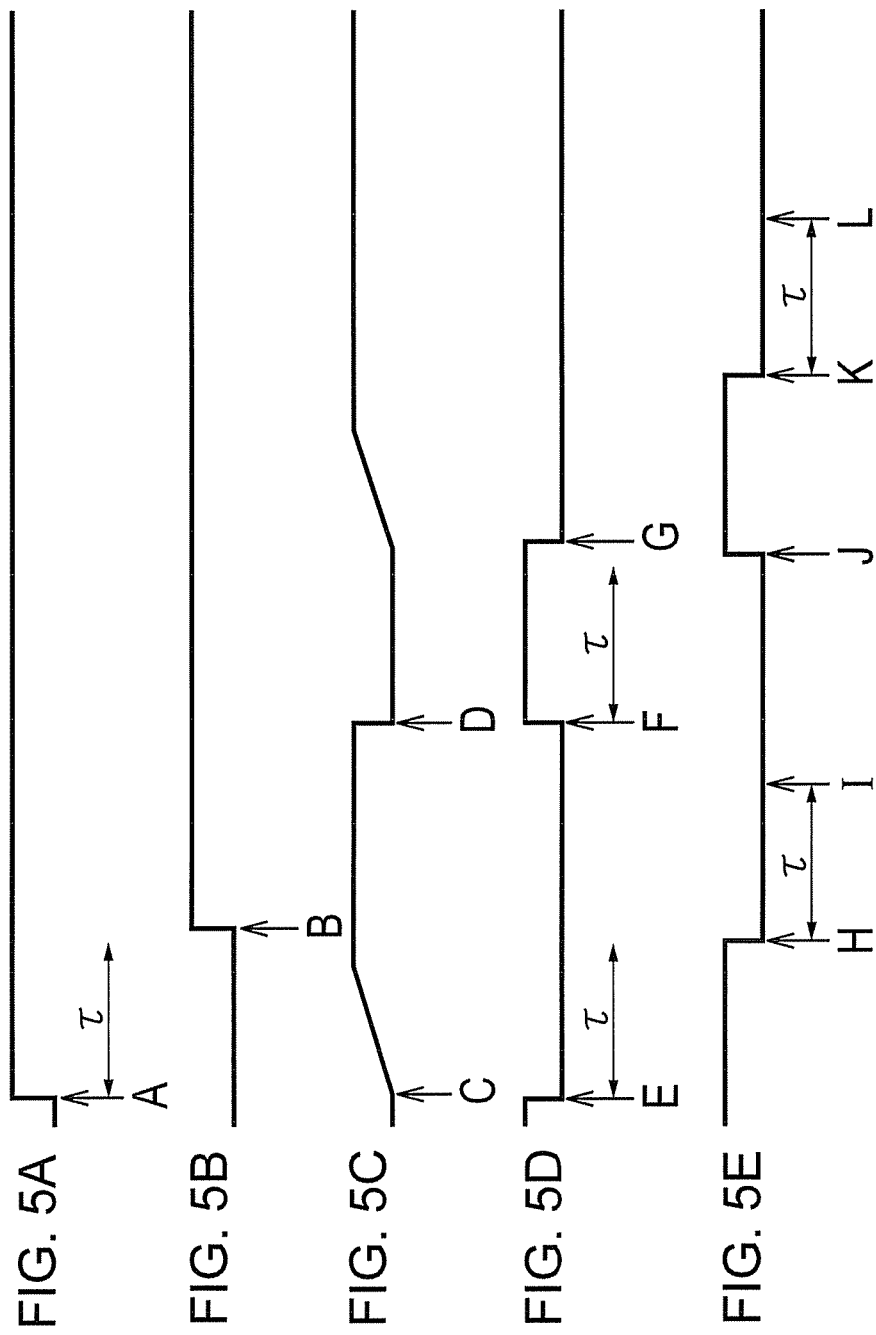

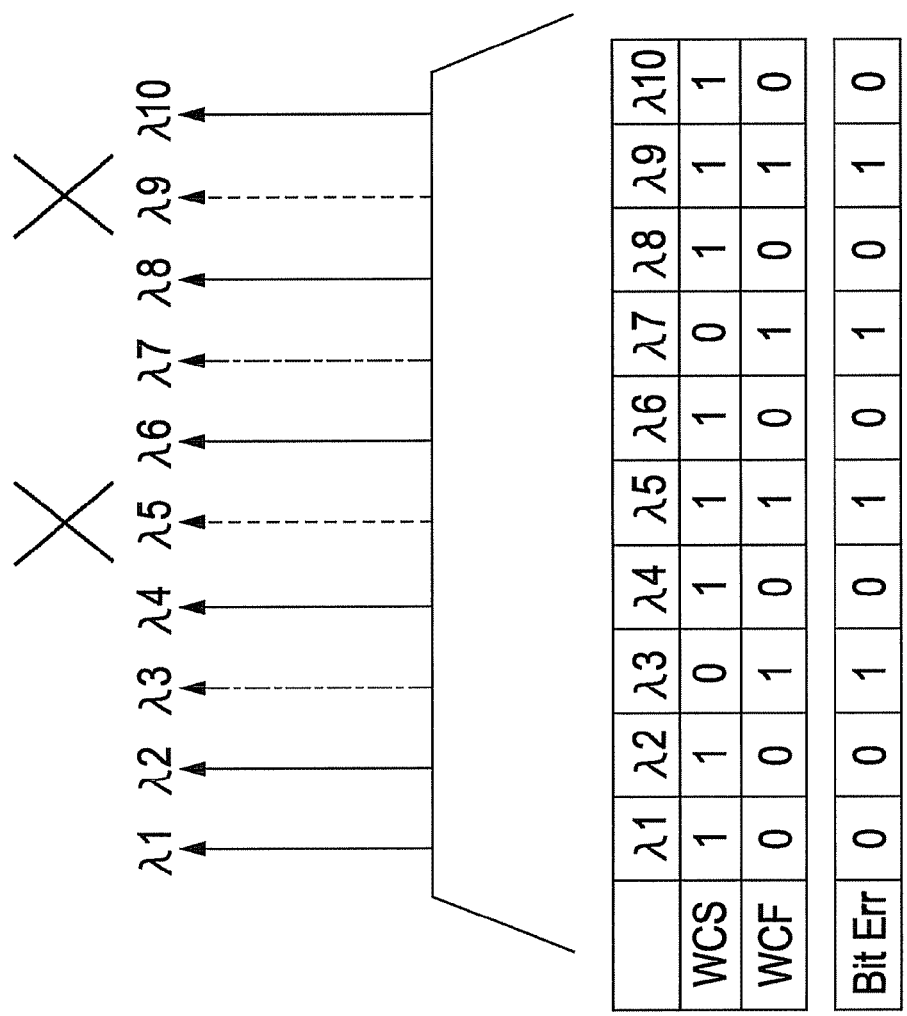

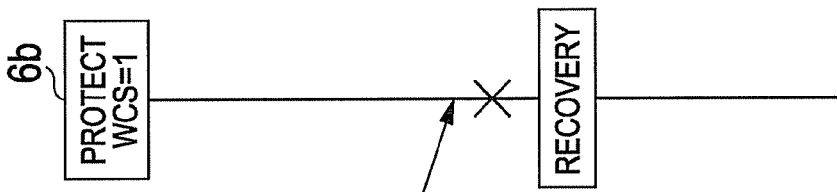
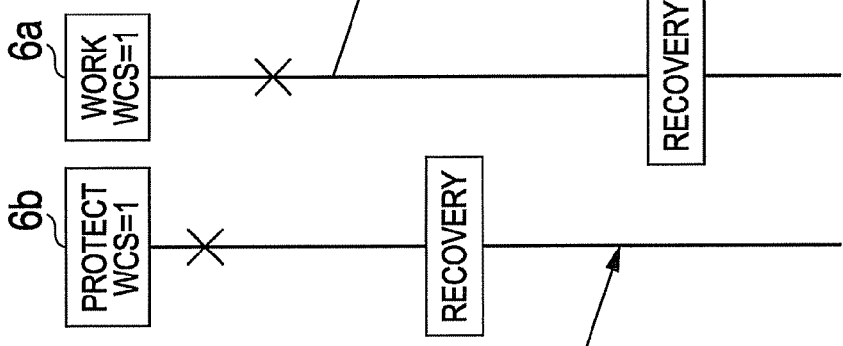
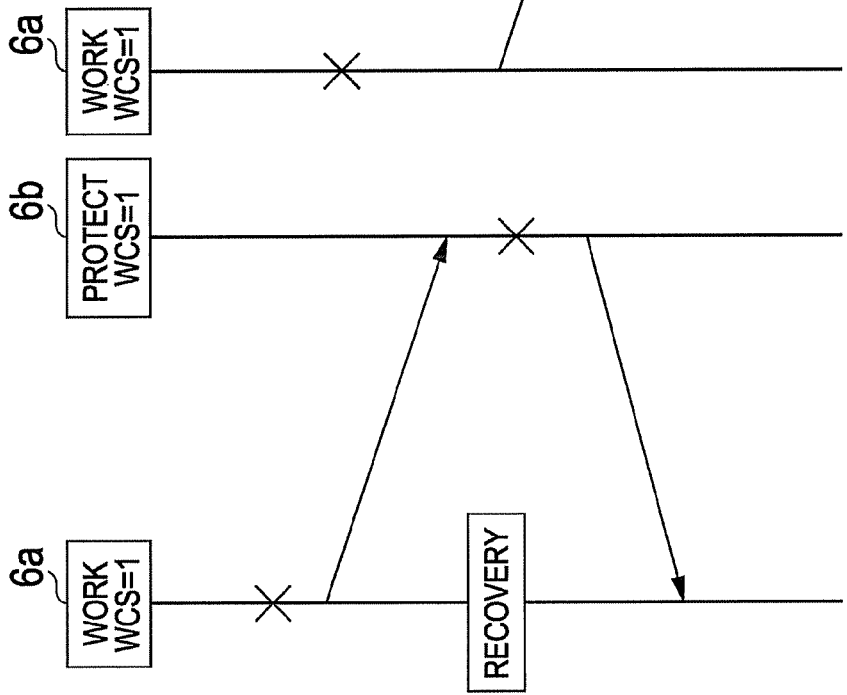

OPTICAL COMMUNICATION SYSTEM, OPTICAL RECEIVING TERMINAL, AND OPTICAL SIGNAL FAULT DETECTION METHOD

CROSS-REFERENCE TO RELATED APPLICATIONS

This is a continuation of Application PCT/JP2007/065813, filed on Aug. 13, 2007, the entire contents of which are incorporated herein by reference.

FIELD

The embodiments discussed herein are related to an optical communication system.

BACKGROUND

Optical communication systems perform wavelength-division multiplexing (WDM) transmission in which a plurality of optical signals is transmitted with a plurality of optical channels having different wavelengths. There is an optical communication system for switching between a currently used line and a backup line using the Optical Unidirectional Path Switched Ring (OUPSR) method to increase the reliability thereof.

Switching between a currently used line and a backup line is performed when an optical receiving terminal included in an optical communication system cannot receive an optical signal owing to the failure of an optical channel. Accordingly, in this case, the optical receiving terminal may receive light from an optical transmission path and detect the fault of the optical signal. In a standard such as SONET, it is required to perform switching between a currently used line and a backup line within 50 ms of an optical signal fault in an optical channel.

On the other hand, it is difficult to actually detect an optical signal fault. In the case of optical communication using a transmission path formed of an optical fiber, in order to increase a transmission distance, each of an optical transmission terminal, an optical relay terminal, and an optical receiving terminal included in an optical communication system includes an optical amplifier for directly amplifying incident light. The optical amplifier generates amplified spontaneous emission (ASE) light when amplifying a received optical signal. Accordingly, since light received by the optical receiving terminal includes not only signal light but also ASE light, it cannot be determined whether received light is ASE light or signal light only by detecting light transmitted from an optical transmission path.

Japanese Laid-open Patent Publication No. 2001-244900 discusses a technique for switching between a currently used line and a backup line.

SUMMARY

According to an aspect of the embodiment, an optical communication system includes an optical transmission terminal including a first transmitter for transmitting an optical signal, and a second transmitter for transmitting information that indicates the first transmitter transmitting the optical signal; and an optical receiving terminal including an optical receiver for receiving the optical signal and the information transmitted from the first and second transmitter, respectively, a storage device for storing a power value of the optical signal monitored in response to receipt of the information transmitted from the second transmitter, and a fault detector for detecting fault of the optical signal by continuously monitoring a power value of the optical signal received by the optical receiver in comparison with the power value stored in the storage device.

The object and advantages of the embodiment will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 5A to 5E are each time chart in a configuration according to an embodiment;

FIG. 6 is a diagram illustrating the relationship between an optical channel and an optical signal;

FIGS. 9A, 9B, and 9C are diagrams illustrating a second switching operation;

DESCRIPTION OF EMBODIMENTS

Embodiments of the present invention will be described below with reference to the accompanying drawings. A configuration according to an embodiment of the present invention is merely illustrative, and the present invention is not limited thereto.

Figure 1:
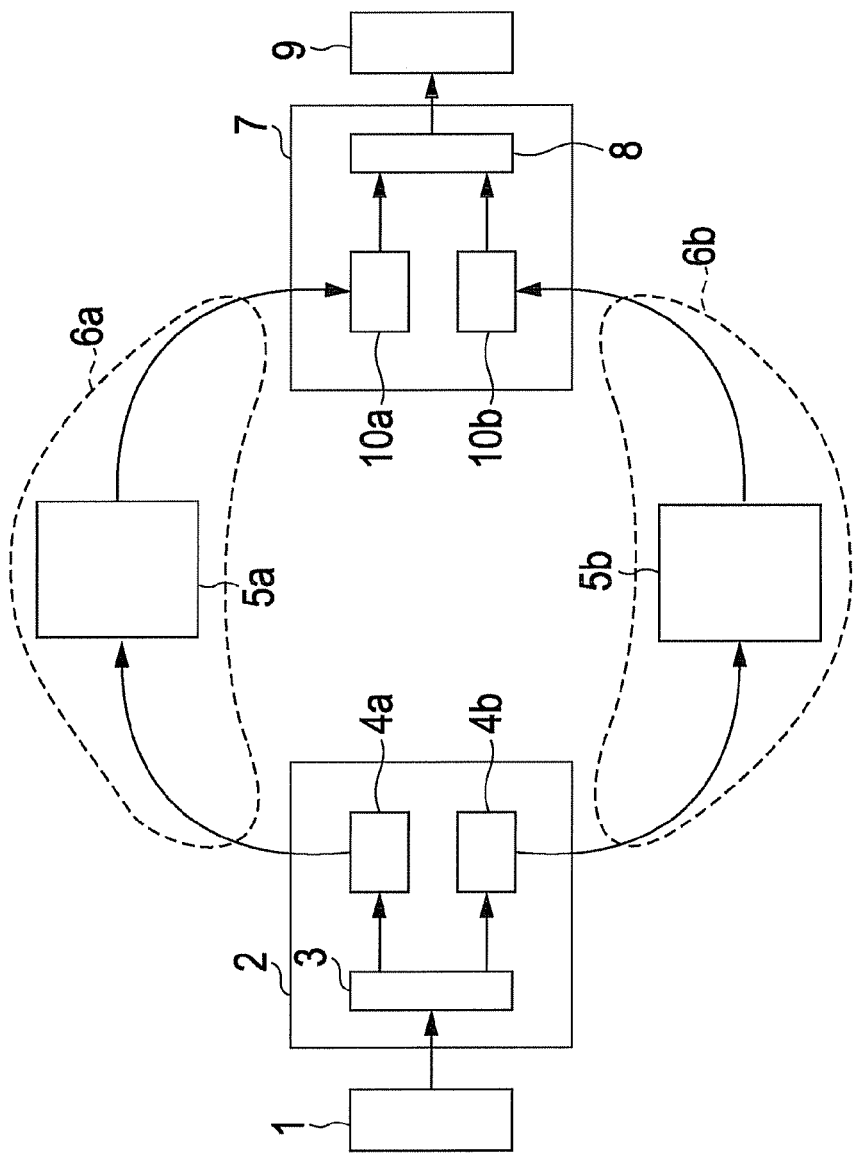
FIG. 1 is a diagram illustrating a configuration of an optical communication system according to an embodiment.

FIG. 1 is a diagram illustrating a configuration of an optical communication system according to an embodiment of the present invention. An optical ring network includes a first path 6a and a second path 6b which are capable of performing optical transmission and a plurality of optical terminals. Switching between a currently used line and a backup line can be performed by performing switching between the first path 6a and the second path 6b in the optical ring network. A description will be made using an Optical Unidirectional Path Switched Ring (OUPSR) system in this embodiment, but this embodiment is not limited to the OUPSR system. A plurality of optical terminals are disposed on an optical ring network. These optical terminals include an optical transmission terminal 2, optical relay terminals 5a and 5b, and an optical receiving terminal 7.

The optical transmission terminal 2 is connected to an optical transmitter 1. An optical coupler 3 included in the optical transmission terminal 2 splits an optical signal transmitted from the optical transmitter 1. Although not illustrated, the same number of the optical transmitters 1 and the same number of the optical couplers 3 as that of optical channels of optical wavelengths used in Wavelength Division Multiplexing (WDM) are present. The optical signals obtained by the optical coupler 3 are individually input into WDM couplers 4a and 4b. The optical signal input into the WDM coupler 4a is wavelength-division multiplexed with an optical signal of another optical channel and is then input into the first path 6a. The optical signal input into the WDM coupler 4b is wavelength-division multiplexed with an optical signal of another optical channel and is then input into the second path 6b.

The optical relay terminal (add/drop multiplexer) 5a is on the first path 6a, and the optical relay terminal (add/drop multiplexer) 5b is on the second path 6b. Each of the optical relay terminals 5a and 5b wavelength-division demultiplexes a wavelength-division multiplexed optical signal into optical signals corresponding to optical channels so as to drop a predetermined optical channel. Furthermore, each of the optical relay terminals 5a and 5b adds a new optical signal to the dropped optical channel and transmits it to a downstream.

An optical receiving terminal 7 includes WDM couplers 10a and 10b and a line switching unit 8. The optical receiving terminal 7 individually receives wavelength-division multiplexed optical signals from the first path 6a and the second path 6b. Each of the WDM couplers 10a and 10b included in the optical receiving terminal 7 demultiplexes the received wavelength-division multiplexed optical signal into optical signals corresponding to optical channels. Each of the optical signals corresponding to optical channels demultiplexed by the WDM coupler 10a is input into the line switching unit 8 along with a corresponding backup optical signal (a corresponding optical signal demultiplexed by the WDM coupler 10b). The output of the line switching unit 8 is input into an optical receiver 9. The line switching unit 8 detects whether there is an optical signal and selects one of the optical signal transmitted from the first path 6a and the optical signal transmitted from the second path 6b.

Figure 2:
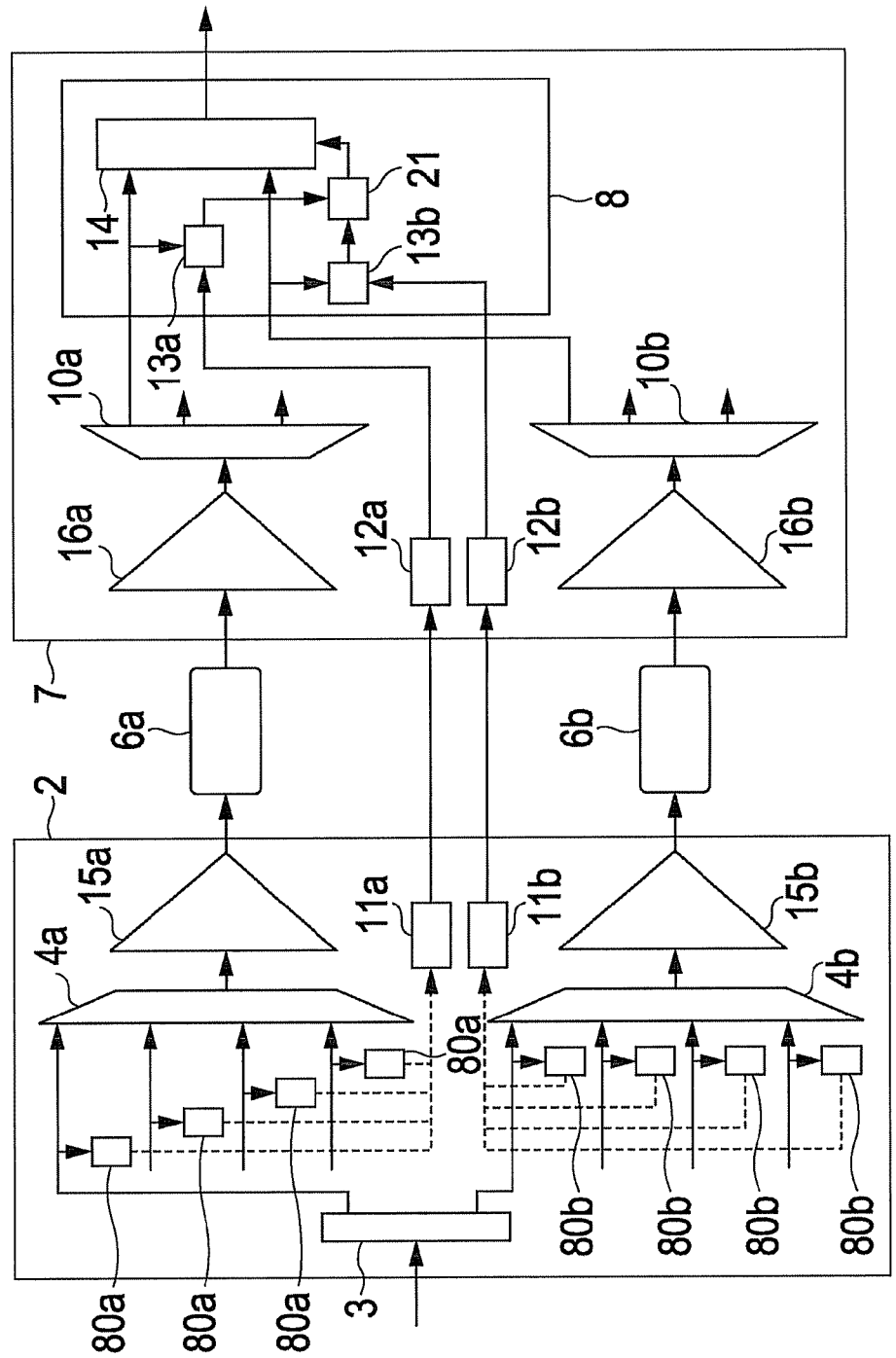
FIG. 2 is a diagram illustrating configurations of an optical transmission terminal according to a first embodiment and an optical receiving terminal according to the first embodiment.

FIG. 2 is a diagram illustrating configurations of an optical transmission terminal according to a first embodiment and an optical receiving terminal according to the first embodiment. The same numerals are used for like components so as to avoid repeated explanation.

[Optical Transmission Terminal]

The optical transmission terminal 2 includes the WDM couplers 4a and 4b, the optical coupler 3, a plurality of light-receiving elements 80a, a plurality of light-receiving elements 80b, optical amplifiers 15a and 15b, and optical supervisory channel (OSC) transmission units 11a and 11b.

The optical coupler 3 splits an optical signal transmitted from the optical transmitter 1 illustrated in FIG. 1 into optical signals and transmits one of the optical signals to the WDM coupler 4a and the light-receiving elements 80a and the other one of the optical signals to the WDM coupler 4b and the light-receiving elements 80b.

The light-receiving elements 80a and the light-receiving elements 80b detect whether the optical signals supplied to the WDM couplers 4a and 4b are present in an optical channel, respectively. Light detected by the light-receiving elements 80a and 80b does not include an ASE light component, since it has yet to be processed by the optical amplifiers 15a and 15b. The optical amplifiers 15a and 15b are each optical transmitter for transmitting the optical signal. The detection results of the optical signals performed by the light-receiving elements 80a and 80b are used as wavelength channel failure (WCF) information representing that an optical signal of an optical channel for which optical signal fault detection is performed is output or is not output. In this embodiment, for example, the WCF information indicates "0" in a case where an optical signal is present, and "1" in a case where no optical signal is present. The WCF information is transmitted to the OSC transmission unit 11a.

The OSC transmission unit 11a transmits an OSC signal used for supervisory control of the first path 6a. The OSC transmission unit 11a transmits the OSC signal to the optical receiving terminal 7 through the first path 6a or another path. The OSC signal includes wavelength channel service (WCS) information B that is information about a used optical channel for which a carrier for managing the optical communication system determines to provide a service and WCF information A. In this embodiment, for example, WCS information indicates "1" for an in-service optical channel, and "0" for an out-of-service optical channel. In this embodiment, the WCF information A and the WCS information B are used on the side of the first path 6a.

The OSC transmission unit 11b transmits an OSC signal used for supervisory control of the second path 6b. The OSC transmission unit 11b transmits the OSC signal to the optical receiving terminal 7 through the second path 6b or another path. The OSC signal includes wavelength channel service (WCS) information D that is information about a used optical channel for which a carrier for managing the optical communication system determines to provide a service and WCF information C. In this embodiment, for example, WCS information indicates "1" for an in-service optical channel, and "0" for an out-of-service optical channel. In this embodiment, the WCF information C and the WCS information D are used on the side of the second path 6b.

The WDM couplers 4a and 4b individually wavelength-division multiplex the optical signals transmitted from the optical coupler 3.

The optical amplifier 15a amplifies the optical signal wavelength-division multiplexed by the WDM coupler 4a and outputs the amplified light to the first path 6a. The optical amplifier 15b similarly amplifies the optical signal wavelength-division multiplexed by the WDM coupler 4b and outputs the amplified light to the second path 6b.

[Optical Receiving Terminal]

The optical receiving terminal 7 includes optical amplifiers 16a and 16b, the WDM couplers 10a and 10b, OSC receiving units 12a and 12b, and the line switching unit 8.

The OSC receiving units 12a and 12b receive the OSC signals from the OSC transmission units 11a and 11b, respectively. The OSC receiving unit 12a extracts the WCF information A and the WCS information B from the OSC signal and transmits them to the line switching unit 8. The OSC receiving unit 12b extracts the WCF information C and the WCS information D from the OSC signal and transmits them to the line switching unit 8.

The optical amplifier 16a couples to the first path 6a. The optical amplifier 16b couples to the second path 6b. The optical amplifier 16a amplifies the light transmitted through the first path 6a and supplies the amplified light to the WDM coupler 10a. The optical amplifier 16b amplifies the light transmitted through the second path 6b and supplies the amplified light to the WDM coupler 10b.

The WDM couplers 10a and 10b demultiplex the wavelength-division multiplexed optical signals transmitted from the optical amplifiers 16a and 16b in units of wavelengths of optical channels, respectively. Each of the WDM couplers 10a and 10b supplies the demultiplexed light to the line switching unit 8. As a result, a pair of light transmitted through the first path 6a corresponding to a currently used optical channel and light transmitted through the second path 6b corresponding to a backup channel is supplied to the line switching unit 8.

The line switching unit 8 includes a switch 14, optical signal fault detection units 13a and 13b, and a line switching control circuit 21.

The switch 14 receives light supplied from the WDM coupler 10a and light supplied from WDM coupler 10b as a pair of lights, and outputs one of the received lights in response to a switching signal transmitted from the line switching control circuit 21.

The optical signal fault detection unit 13a receives the light of an optical channel demultiplexed by the WDM coupler 10a and the WCS information B and the WCF information A which have been extracted by the OSC receiving unit 12a, and performs optical signal fault detection on the basis of them. The optical signal fault detection unit 13b receives the light of the optical channel demultiplexed by the WDM coupler 10b and the WCS information D and the WCF information C which have been extracted by the OSC receiving unit 12b, and performs optical signal fault detection on the basis of them. The results of the optical signal fault detection performed by the optical signal fault detection units 13a and 13b are input into the line switching control circuit 21.

The line switching control circuit 21 determines, on the basis of the output from the optical signal fault detection units 13a and 13b, which of the light transmitted from the WDM coupler 10a and the light transmitted from the WDM coupler 10b is selected, and outputs a signal used to control the switch 14.

[Line Switching Unit]

Figure 3:
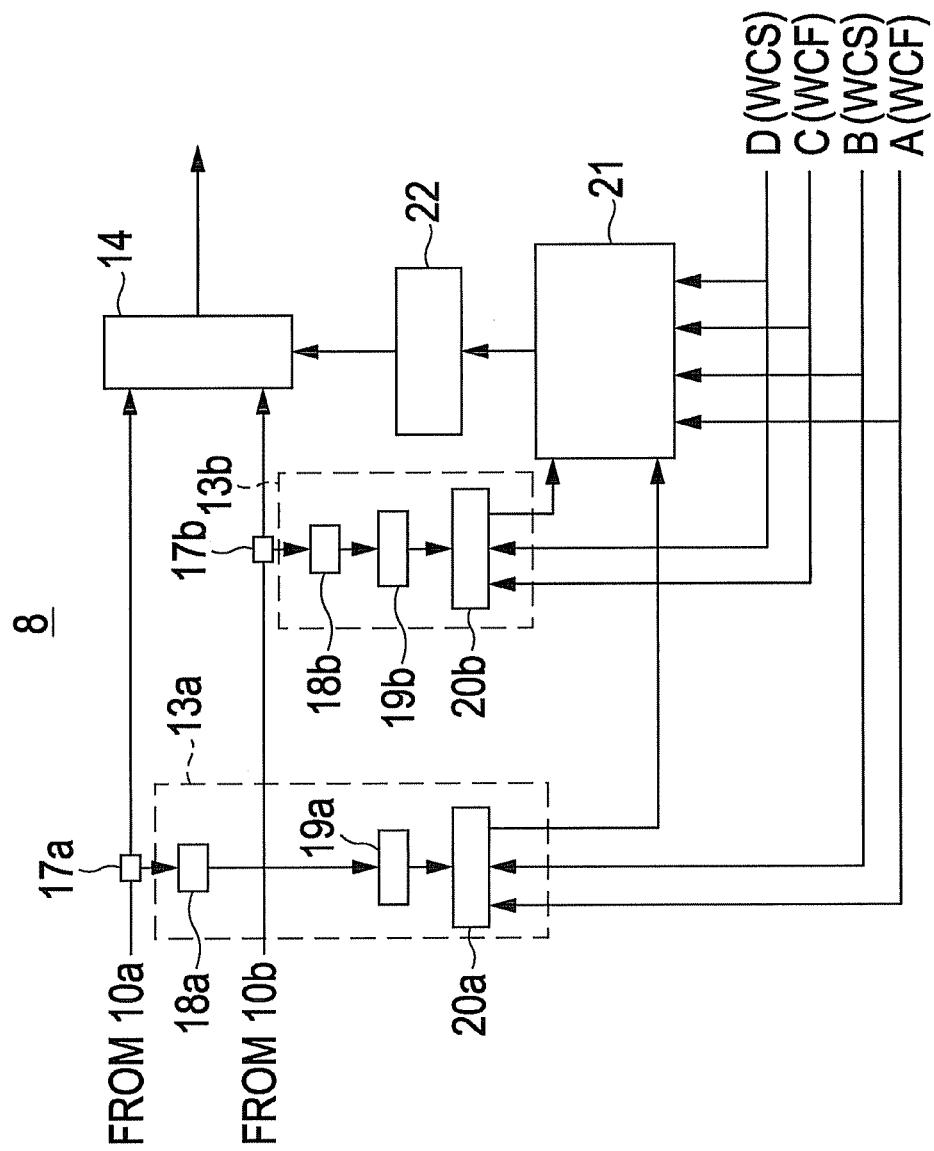
FIG. 3 is a diagram illustrating a line switching unit.

FIG. 3 illustrates the line switching unit 8. An optical coupler 17a splits the light transmitted from the WDM coupler 10a into two lights. One of the lights is input into the switch 14, and the other one of the lights is input into the optical signal fault detection unit 13a.

The optical signal fault detection unit 13a includes a light-receiving element 18a, an analog-to-digital converter (ADC) 19a, and a fault detector 20a. The light-receiving element 18a converts the light transmitted from the optical coupler 17a into a current. The ADC 19a converts a value of the current transmitted from the light-receiving element 18a into a digital current value. The fault detector 20a performs optical signal fault detection on the basis of the digital value obtained by the ADC 19a and the WCF information A and the WCS information B which have been transmitted through the first path 6a. The fault detector 20a will be described in detail later with reference to an accompanying drawing.

An optical coupler 17b splits the light transmitted from the WDM coupler 10b into two lights. One of the lights is input into the switch 14, and the other one of the lights is input into the optical signal fault detection unit 13b. The optical signal fault detection unit 13b includes a light-receiving element 18b, an analog-to-digital converter (ADC) 19b, and a fault detector 20b. The light-receiving element 18b converts the light transmitted from the optical coupler 17b into a current. The ADC 19b converts a value of the current transmitted from the light-receiving element 18b into a digital current value. The fault detector 20b performs optical signal fault detection on the basis of the digital value obtained by the ADC 19b and the WCF information C and the WCS information D which have been transmitted through the second path 6b.

The line switching control circuit 21 determines which of the light transmitted from the WDM coupler 10a and the light transmitted from the WDM coupler 10b is output on the basis of the results of the optical signal fault detection performed by the optical signal fault detection units 13a and 13b. At that time, it is required to perform switching in consideration of the status of an optical signal on a path to be switched. Accordingly, control processing is performed using not only the WCF information A and the WCS information B for the first path 6a that is a currently used path but also the WCF information C and the WCS information D for the second path 6b that is a back up path. The line switching control circuit 21 will be described in detail later with reference to an accompanying drawing.

A driving circuit 22 controls the switch 14 on the basis of a control signal transmitted from the line switching control circuit 21. The switch 14 outputs one of the lights transmitted from the WDM couplers 10a and 10b on the basis of a control signal transmitted from the driving circuit 22.

[Optical Signal Fault Detection Circuit]

Figure 4:
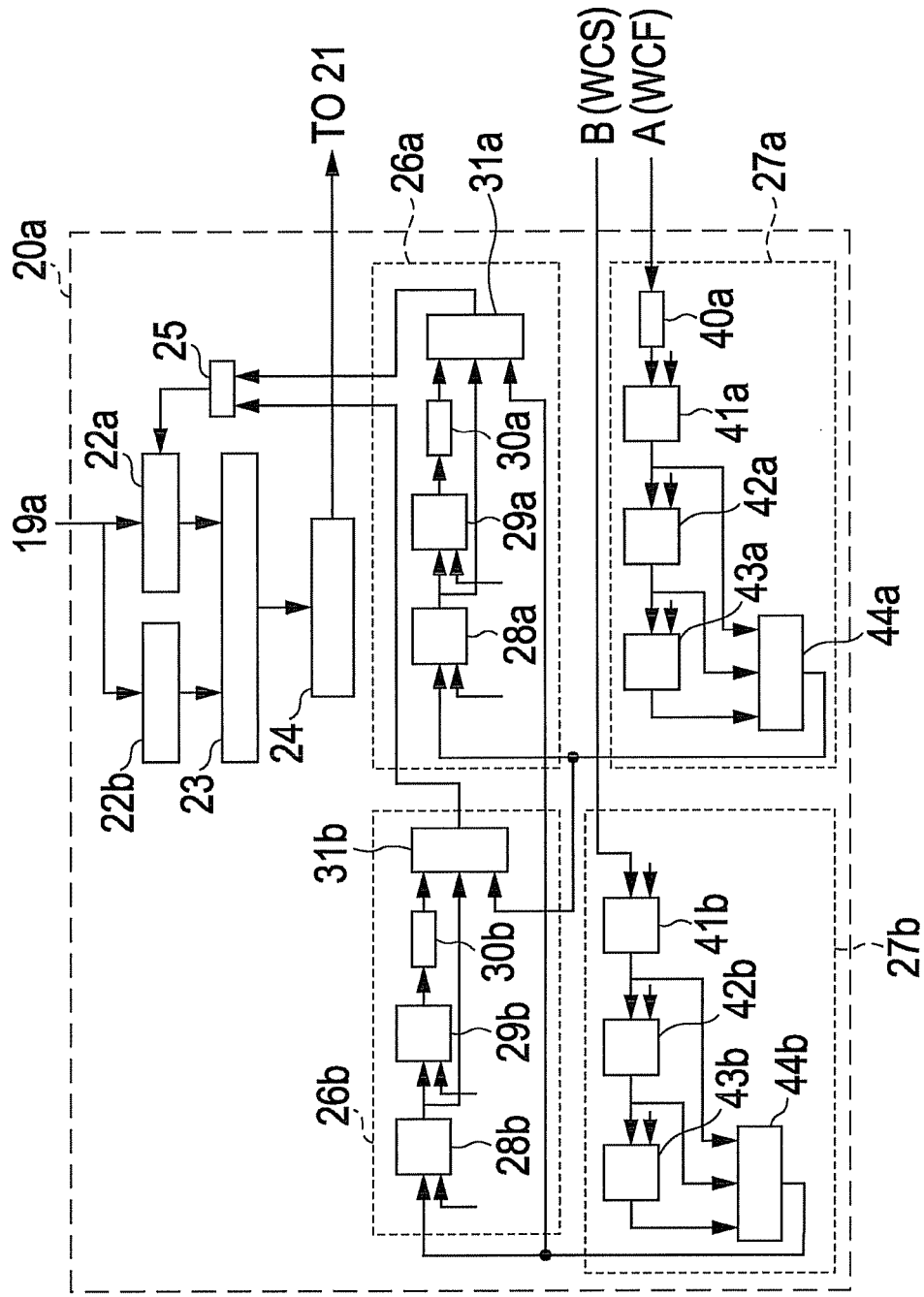
FIG. 4 is a diagram illustrating a configuration of a fault detector.

FIG. 4 is a diagram illustrating the configuration of the fault detector 20a.

The fault detector 20a includes registers 22b and 22a, a processor (ALU) 23, a comparator 24, an OR circuit 25, pulse creation circuits 26a and 26b, and counter circuits 27a and 27b.

The registers 22a and 22b are each storage device. The registers 22a and 22b receive a value from the ADC 19a illustrated in FIG. 3. The register 22b stores the current intensity (level) of light obtained in the sampling period of the ADC 19a. The register 22a also stores the power value of light obtained in the sampling period of the ADC 19a until the WCF information and the WCS information are input. When an enable signal is input into the register 22a, the register 22a stores a power value at that time. The registers 22a and 22b may be arranged out of the fault detector 20a.

For example, the ALU 23 subtracts a value output from the register 22a from a value output from the register 22b. In an initial state and a normal state (in which received light includes an optical signal), the values output from the registers 22b and 22a are the same. Accordingly, the ALU 23 outputs zero as a computation result. When a failure occurs on a used path, a value output from the register 22b becomes small since received light does not include an optical signal. Accordingly, the ALU 23 outputs a negative value as a computation result.

The comparator 24 compares the value of the computation result with a predetermined value. When the value of the comparison result is smaller than a predetermined value, the comparator 24 determines that the fault of an optical signal has occurred and outputs a trigger signal to the line switching control circuit 21 illustrated in FIG. 3. In this embodiment, at the time of occurrence of an optical signal fault, the trigger signal is changed from "0" to "1". The predetermined value used by the comparator 24 is a fault detection threshold value. Received light usually includes an ASE light component that is several dB to 10 dB lower than an optical signal component. Accordingly, as the fault detection threshold value, a value with which only remaining ASE light can be detected may be set. In this embodiment, 8 dB is set as the fault detection threshold value.

The counter circuit 27a receives the WCF information A for a corresponding optical channel from the OSC receiving unit 12a and detects whether a change occurs within a predetermined time period after the WCF information A has been changed. The counter circuit 27a includes an inverter 40a, flip-flops 41a, 42a, and 43a, and an AND gate 44a.

The inverter 40a inverts the WCF information A and transmits the inverted WCF information A to the flip-flop 41a. The inverter 40a performs inversion so as to match the logic of WCF information to that of WCS information. That is, the WCF information indicates "0" when an optical signal is present and "1" when no optical signal is present, while the WCS information indicates "1" when an optical signal is present and "0" when no optical signal is present.

The flip-flop 41a receives a signal output from the inverter 40a and a clock and transmits an output signal to the flip-flop 42a and the AND gate 44a. The flip-flop 42a receives the signal output from the inverter 41a and a clock and transmits an output signal to the flip-flop 43a and the AND gate 44a. The flip-flop 43a receives the signal output from the flip-flop 42a and a clock and transmits an output signal to the AND gate 44a. The AND gate 44a outputs the logical AND among the signals output from the flip-flops 41a, 42a, and 43a. The output of the AND gate 44a is input into the pulse creation circuits 26a and 26b as the output of the counter circuit 27a.

The pulse creation circuit 26a is a circuit for creating a pulse functioning as an enable signal. The pulse creation circuit 26a includes flip-flops 28a and 29a, an inverter 30a, and an AND gate 31a. The flip-flop 28a receives the output of the counter circuit 27a and a clock, and transmits an output signal to the flip-flop 29a and the AND gate 31a. The flip-flop 29a receives the output of the flip-flop 28a and a clock, and transmits an output signal to the inverter 30a. The AND gate 31a outputs the logical AND among the signals output from the inverter 30a, the flip-flop 28a, and the counter circuit 27b. That is, the pulse creation circuit 26a outputs a single pulse when the outputs of the counter circuits 27a and 27b are "1" and the counter circuit 27a is changed from "0" to "1".

The counter circuit 27b receives the WCS information B for a corresponding optical channel from the OSC receiving unit 12b and detects whether a change occurs within a predetermined time period after the WCS information B has been changed. The counter circuit 27b includes flip-flops 41b, 42b, and 43b and an AND gate 44b.

The flip-flop 41b receives a signal output from an inverter 40b and a clock and transmits an output signal to the flip-flop 42b and the AND gate 44b. The flip-flop 42b receives the signal output from the flip-flop 41b and a clock and transmits an output signal to the flip-flop 43b and the AND gate 44b. The flip-flop 43b receives the signal output from the inverter 42b and a clock and transmits an output signal to the AND gate 44b. The AND gate 44b outputs the logical AND among the signals output from the flip-flops 41b, 42b, and 43b. The output of the AND gate 44b is input into the pulse creation circuits 26a and 26b as the output of the counter circuit 27b.

The pulse creation circuit 26b is a circuit for creating a pulse functioning as an enable signal. The pulse creation circuit 26b includes flip-flops 28b and 29b, an inverter 30b, and an AND gate 31b. The flip-flop 28b receives the output of the counter circuit 27b and a clock, and transmits an output signal to the flip-flop 29b and the AND gate 31b. The flip-flop 29b receives the output of the flip-flop 28b and a clock, and transmits an output signal to the inverter 30b. The AND gate 31b outputs the logical AND among the signals output from the inverter 30b, the flip-flop 28b, and the counter circuit 27a. That is, the pulse creation circuit 26b outputs a single pulse when the outputs of the counter circuits 27a and 27b are "1" and the counter circuit 27b is changed from "0" to "1".

The OR circuit 25 sets the OR condition of pulses output from the pulse creation circuits 26a and 26b as an enable signal used to fix data of the register 22a.

It is desirable that a time set for the counter circuits 27a and 27b be sufficiently longer than a transmission delay of an OSC signal.

An OSC signal is used for supervisory control, and a speed at which an OSC signal is transmitted from a transmission terminal is lower than a speed at which an optical signal is transmitted from the transmission terminal. When information indicating that an optical signal is coming continues for a time longer than the transmission time of an OSC signal, it can be determined that the state is power of a state in which an optical signal is certainly coming.

Accordingly, when the power of the state in which an optical signal is certainly coming is stored in the register 22a using an enable signal, the power of a state in which an optical signal is certainly present is automatically stored.

In this embodiment, the fault detector 20a uses both the WCF information A and the WCS information B, but may use only the WCF information A. In this case, the counter circuit 27b, the pulse creation circuit 26b, and the OR circuit 25 are removed, the AND gate 31a obtains the logical AND between signals output from the flip-flop 29a and the inverter 30a, and the output of the AND gate 31a is transmitted to the register 22a as an enable signal.

The configuration of the fault detector 20a has been described. The fault detector 20b has the same configuration as that of the fault detector 20a except that the value of the ADC 19b is supplied to the registers 22b and 22a and the WCF information C and the WCS information D for the second path 6b are supplied to the counter circuits 27a and 27b, respectively.

[Time Chart in this Configuration]

FIG. 5 is a time chart in this configuration. The time chart illustrates the signal state of each unit on a first path. Since this time chart can be applied to the second path 6b, the description thereof is therefore omitted.

FIG. 5A illustrates the state of the WCS information B in the OSC transmission unit 11a. FIG. 5B illustrates the state of the WCS information B in the OSC receiving unit 12a. FIG. 5C illustrates the state of the light-receiving elements 80a. FIG. 5D illustrates the state of the WCF information A in the OSC transmission unit 11a. FIG. 5E illustrates the state of the WCF information A in the OSC receiving unit 12a.

At a point A in FIG. 5A, a carrier sets starting of a service for the optical transmitter 1 illustrated in FIG. 1 and the WCS information B is changed from "0" to "1". At a point B in FIG. 5B after a transmission delay T has elapsed from the point A at which the WCS information B was changed from "0" to "1", the WCS information B reaches the OSC receiving unit 12a. When the operation of the optical transmitter 1 is started, the light-receiving elements 80a start to detect optical power at a point C in FIG. 5C. When the light-receiving elements 80a detect optical power, the WCF information A is changed from "1" to "0" at a point E in FIG. 5D. The change of the WCF information A at the point E is received by the OSC receiving unit 12a at a point H in FIG. 5E after the transmission delay T has elapsed from the point E. The counter circuit 27a starts a count operation at the point H in FIG. 5E. The optical signal fault detection unit 13a generates an enable signal at a point I in FIG. 5E at which the transmission delay T has elapsed from the point H and the WCS information B illustrated in FIG. 5B is "1".

At a point D in FIG. 5C, the fault of an optical signal output from the optical transmitter 1 occurs. Since the optical signal is not transmitted, the value of the register 22b is also changed at the point D in FIG. 5C. After the point D in FIG. 5C, the WCF information A is changed from "0" to "1" at a point F in FIG. 5D. This change of the WCF information A at the point F reaches the OSC receiving unit 12a at a point 3 in FIG. 5E after the transmission delay T has elapsed from the point F.

When the fault of the optical signal output from the optical transmitter 1 is recovered, the WCF information A is changed from "1" to "0" at a point G in FIG. 5D. This change of the WCF information A at the point G reaches the OSC receiving unit 12a at a point K in FIG. 5E after the transmission delay T has elapsed from the point G.

At the point K in FIG. 5E, the counter circuit 27*a* starts a count operation. The optical signal fault detection unit 13*a* generates an enable signal at a point L in FIG. 5E at which the transmission delay T has elapsed from the point K and the WCS information B illustrated in FIG. 5B is "1".

[Relationship Between Optical Channel and Optical Signal]

FIG. 6 is a diagram illustrating the relationship between an optical channel and an optical signal according to an embodiment of the present invention. In FIG. 6, there are optical channels $\lambda 1$ to $\lambda 10$. That is, in this case, ten optical transmitters 1 corresponding to the number of wavelengths of these optical channels are required. Furthermore, the WDM couplers 4*a* and 4*b* are required to have the capability to multiplex ten wavelengths of the ten optical channels.

In FIG. 6, an optical channel having WCS information of "1" represents an optical channel of a wavelength for which a carrier provides a service, and an optical channel having WCF information of "1" represents an optical channel of a wavelength that is not detected by the light-receiving elements 80*a*. The optical channels $\lambda 5$ and $\lambda 9$ indicate a state in which the optical transmitter 1 is operated, the light-receiving elements 80*a* do not detect light, and a line is disconnected.

[First Switching Operation]

Figure 7B:
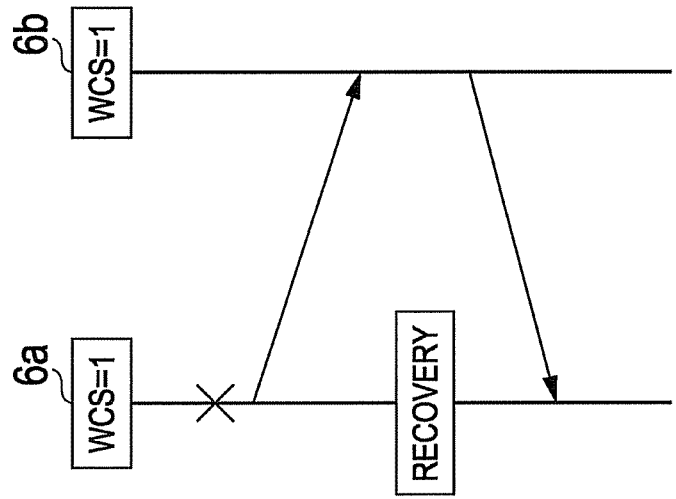
FIGS. 7A and 7B are diagrams illustrating a first switching operation.
Figure 7A:
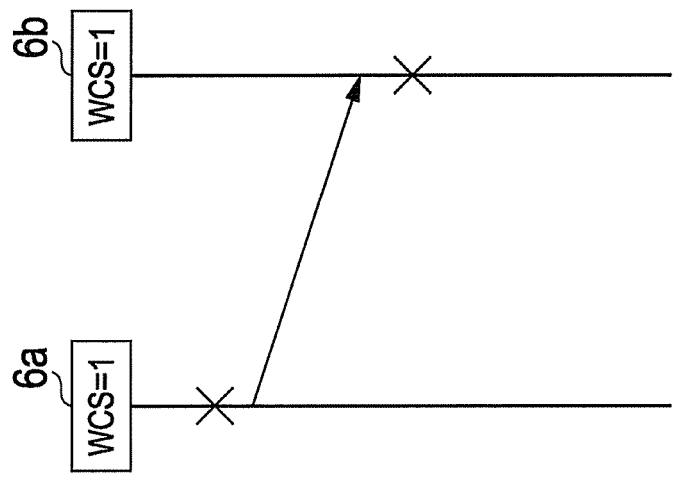

A switching operation performed in the sate of the optical channels $\lambda 5$ and $\lambda 9$ or when the optical signal fault detection unit 13*a* detects the fault of an optical signal will be described below. FIGS. 7A and 7B are diagrams illustrating the first switching operation. In FIGS. 7A and 7B, optical channels corresponding to the first path 6*a* and the second path 6*b* are in-service optical channels supported by a carrier, and have the WCS information of "1".

In FIG. 7A, first, a failure occurs in an optical channel corresponding to the first path 6*a*. Subsequently, the line switching unit 8 switches a line (optical channel) from a line (optical channel) on the first path 6*a* to a line (optical channel) on the second path 6*b*. Subsequently, a failure occurs in the optical channel corresponding to the second path 6*b*. At that time, if the optical channel corresponding to the first path 6*a* has yet to be recovered, line switching is not performed.

In FIG. 7B, first, a failure occurs in an optical channel corresponding to the first path 6*a*. Subsequently, the line switching unit 8 switches an optical channel from the optical channel corresponding to the first path 6*a* to an optical channel corresponding to the second path 6*b*. If the optical channel corresponding to the first path 6*a* is recovered when the optical channel corresponding to the second path 6*b* is used, the line switching unit 8 reselects the optical channel corresponding to the first path 6*a*. At that time, the line switching unit 8 does not take the presence of a failure in the optical channel corresponding to the second path 6*b* into account.

Figure 8:
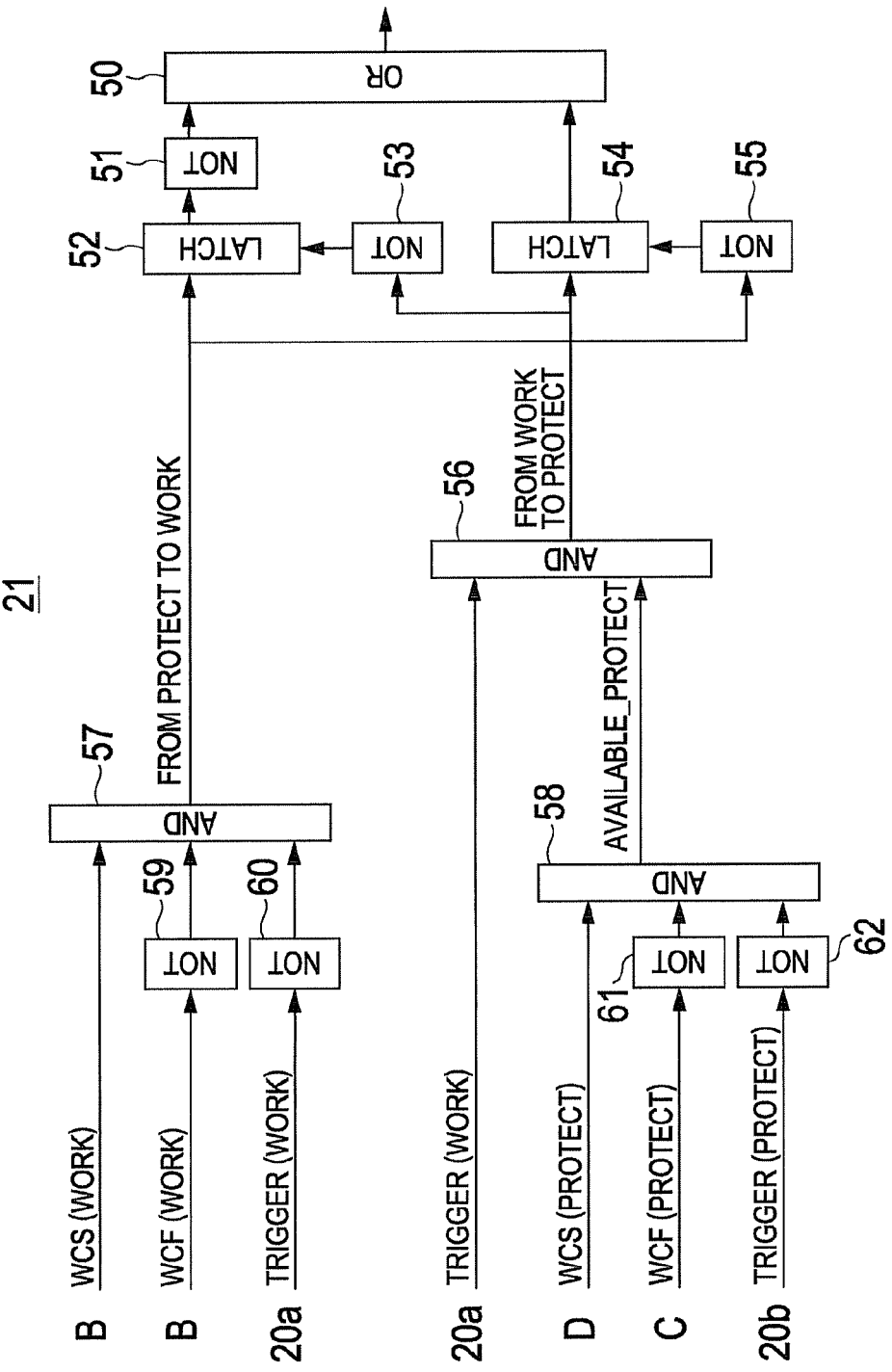
FIG. 8 is a diagram illustrating a line switching control circuit for performing the first switching operation.

A control method of performing the switching operation illustrated in FIGS. 7A and 7B is referred to as a revertive control method. FIG. 8 is a diagram illustrating an example of the line switching control circuit 21 for performing the revertive control method.

The line switching control circuit 21 includes an OR gate 50, inverters 51, 53, 55, 59, 60, 61, and 62, latching circuits 52 and 54, and AND gates 56, 57, and 58.

The inverter 59 receives the WCF information A and outputs an inversion signal. The inverter 60 receives a trigger signal from the fault detector 20*a* and outputs an inversion signal. The AND gate 57 receives the output of the inverter 59, the output of the inverter 60, and the WCS information B and outputs the logical AND among the three inputs. When the output of the AND gate 57 is 1, the first path 6*a* is in a normal state. Accordingly, in this case, the output of the AND gate 57 functions as a signal for selecting an optical channel corresponding to the first path 6*a*.

The inverter 61 receives the WCF information C and outputs an inversion signal. The inverter 62 receives a trigger signal from the fault detector 20*b* and outputs an inversion signal. The AND gate 58 receives the output of the inverter 61, the output of the inverter 62, and the WCS information D and outputs the logical AND among the three inputs. When the output of the AND gate 58 is 1, the second path 6*b* is in a normal state.

The AND gate 56 receives the output of the AND gate 58 and a trigger signal transmitted from the fault detector 20*a* and outputs the logical AND between the two inputs. When the trigger signal input into the AND gate 56 is 1, there is no optical signal on the first path 6*a*. When the output of the AND gate 58 input into the AND gate 56 is 1, the second path 6*b* is in a normal state. Accordingly, when the output of the AND gate 56 is 1, the output of the AND gate 56 functions as a signal for changing the optical channel corresponding to the first path 6*a* to an optical channel corresponding to the second path 6*b*.

The AND gate 57 receives the inversion signal of the trigger signal output from the fault detector 20*a*. The AND gate 56 receives the trigger signal output from the fault detector 20*a*. Accordingly, the AND gates 56 and 57 do not output "1" at the same time.

The inverter 53 inverts the logical AND output from the AND gate 56 and supplies a result of the inversion to the latching circuit 52.

The latching circuit 52 receives the logical AND output from the AND gate 57 and performs latching in response to a signal transmitted from the inverter 53. The inverter 55 inverts the logical AND output from the AND gate 57 and supplies a result of the inversion to the latching circuit 54. The latching circuit 54 receives the logical AND output from the AND gate 56 and performs latching in response to a signal output from the inverter 55. The inverter 51 inverts the output of the latching circuit 52 and outputs a result of the inversion to the OR gate 50. The OR gate 50 outputs the logical OR between the output of the inverter 51 and the output of the latching circuit 54.

In the line switching control circuit 21 having the above-described configuration, it is possible to change an optical channel corresponding to the second path 6*b* back to an optical channel corresponding to the first path 6*a* at the time of failure recovery of the optical channel corresponding to the first path 6*a*. The line switching control circuit 21 can perform switching to a path having WCS information (in-service line).

[Second Switching Operation]

FIGS. 9A, 9B, and 9C are diagrams illustrating the second switching operation. Optical channels corresponding to the first path 6*a* and the second path 6*b* are in-service optical channels supported by a carrier and have the WCS information of "1".

In FIG. 9A, first, a failure occurs in an optical channel corresponding to the first path 6*a*. Subsequently, the line switching unit 8 changes the optical channel corresponding to the first path 6*a* to an optical channel corresponding to the second path 6*b*. When a failure occurs in the optical channel corresponding to the second path 6*b*, the optical channel corresponding to the second path 6*b* is changed back to the optical channel corresponding to the first path 6*a* under the condition that the optical channel corresponding to the first path 6*a* is recovered.

In FIG. 9B, first, communication is performed with the optical channel corresponding to the first path 6*a*. Subsequently, a failure occurs in the optical channel corresponding to the second path 6b. At that time, the failure in the optical channel corresponding to the second path 6b does no have an effect on the communication performed with the optical channel corresponding to the first path 6a. Subsequently, the optical channel corresponding to the second path 6b is recovered. After that, a failure occurs in the optical channel corresponding to the first path 6a. At that time, since the optical channel corresponding to the second path 6b is recovered, the line switching unit 8 switches a line (optical channel) from the optical channel corresponding to the first path 6a to the optical channel corresponding to the second path 6b.

In FIG. 9C, first, a failure occurs in the optical channel corresponding to the first path 6a. Subsequently, the line switching unit 8 switches a line (optical channel) from the optical channel corresponding to the first path 6a to the optical channel corresponding to the second path 6b. After that, a failure also occurs in the optical channel corresponding to the second path 6b. In this state, since both the optical channel corresponding to the first path 6a and the optical channel corresponding to the second path 6b are unusable, the line switching unit 8 does not perform the optical channel switching operation. When the optical channel corresponding to the second path 6b is recovered, communication is performed with the optical channel corresponding to the second path 6b.

Figure 10:
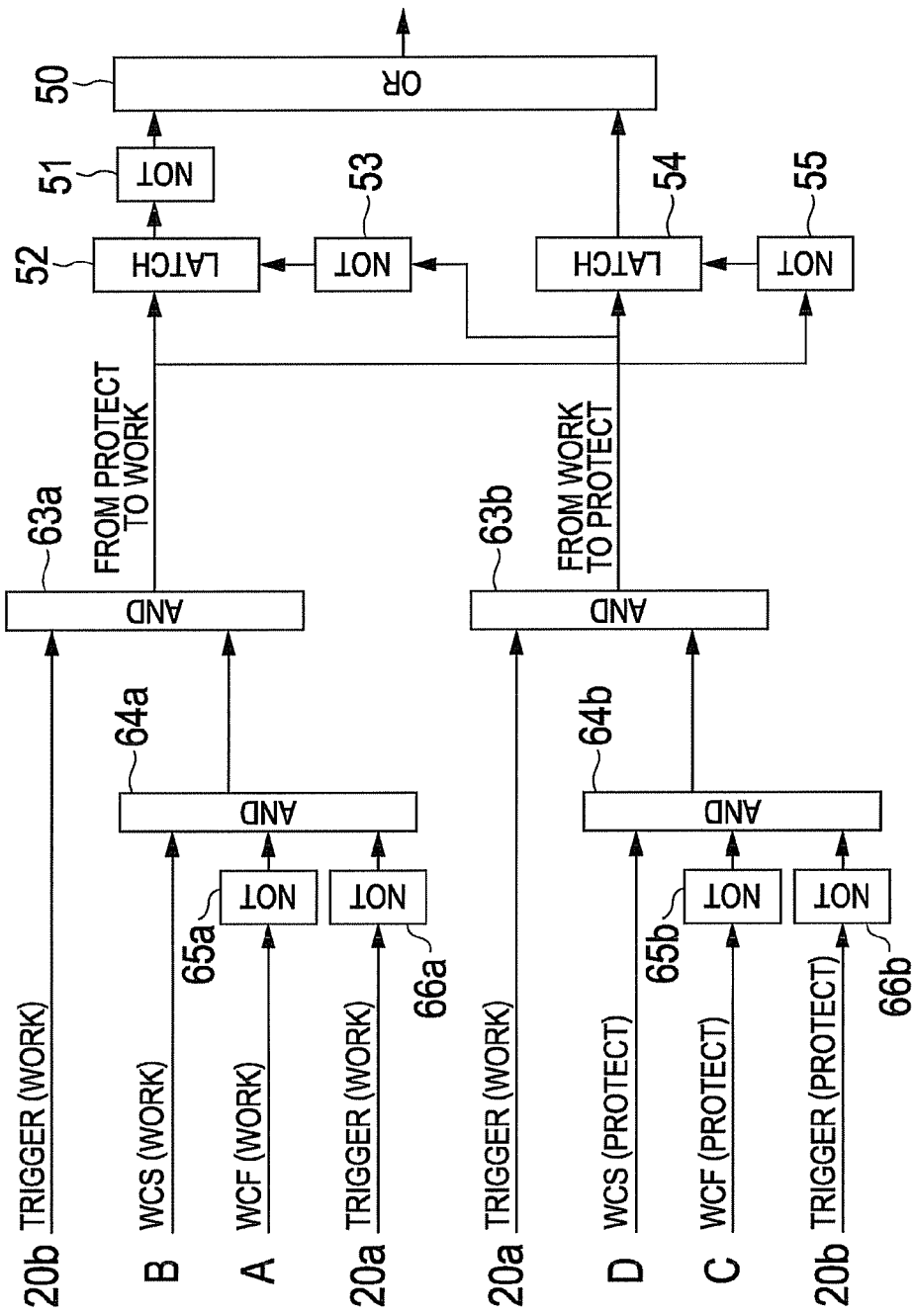
FIG. 10 is a diagram illustrating a line switching control circuit for performing the second switching operation.

A control method of performing the switching operation illustrated in FIGS. 9A, 9B, and 9C is referred to as a non-revertive control method. FIG. 10 is a diagram illustrating an example of the line switching control circuit 21 for performing the non-revertive control method.

The line switching control circuit 21 includes the OR gate 50, the inverters 51, 53, and 55, inverters 65a, 65b, 66a, and 66b, the latching circuits 52 and 54, and AND gates 63a, 63b, 64a, and 64b.

The inverter 65a receives the WCF information A and outputs an inversion signal. The inverter 66a receives a trigger signal from the fault detector 20a and outputs an inversion signal. The AND gate 64a receives the output of the inverter 65a, the output of the inverter 66a, and the WCS information B and outputs the logical AND among the three inputs. When the output of the AND gate 64a is 1, the first path 6a is in a normal state.

The AND gate 63a receives the output of the AND gate 64a and a trigger signal transmitted from the fault detector 20b and outputs the logical AND between the two inputs. When the logical AND output from the AND gate 63a is 1, the output of the AND gate 63a functions as a signal for changing the optical channel corresponding to the second path 6b to the optical channel corresponding to the first path 6a.

The inverter 65b receives the WCF information C and outputs an inversion signal. The inverter 66b receives a trigger signal from the fault detector 20b and outputs an inversion signal. The AND gate 64b receives the output of the inverter 65b, the output of the inverter 66b, and the WCS information D and outputs the logical AND among the three inputs. When the output of the AND gate 64b is 1, the second path 6b is in a normal state.

The AND gate 63b receives the output of the AND gate 64b and a trigger signal transmitted from the fault detector 20a and outputs the logical AND between the two inputs. When the logical AND output from the AND gate 63b is 1, the output of the AND gate 63b functions as a signal for changing the optical channel corresponding to the first path 6a to the optical channel corresponding to the second path 6b.

The inverter 53 inverts the logical AND output from the AND gate 63b and supplies a result of the inversion to the latching circuit 52.

The latching circuit 52 receives the logical AND output from the AND gate 63a and performs latching in response to a signal transmitted from the inverter 53. The inverter 55 inverts the logical AND output from the AND gate 63a and supplies a result of the inversion to the latching circuit 54. The latching circuit 54 receives the logical AND output from the AND gate 63b and performs latching in response to a signal transmitted from the inverter 55. The inverter 51 inverts the output of the latching circuit 52 and outputs a result of the inversion to the OR gate 50. The OR gate 50 outputs the logical OR between the output of the inverter 51 and the output of the latching circuit 54.

In the line switching control circuit 21 having the above-described configuration, it is possible to perform the switching operation illustrated in FIGS. 9A, 9B, and 9C. The line switching control circuit 21 can perform switching to a path having WCS information (in-service line).

Figure 11:
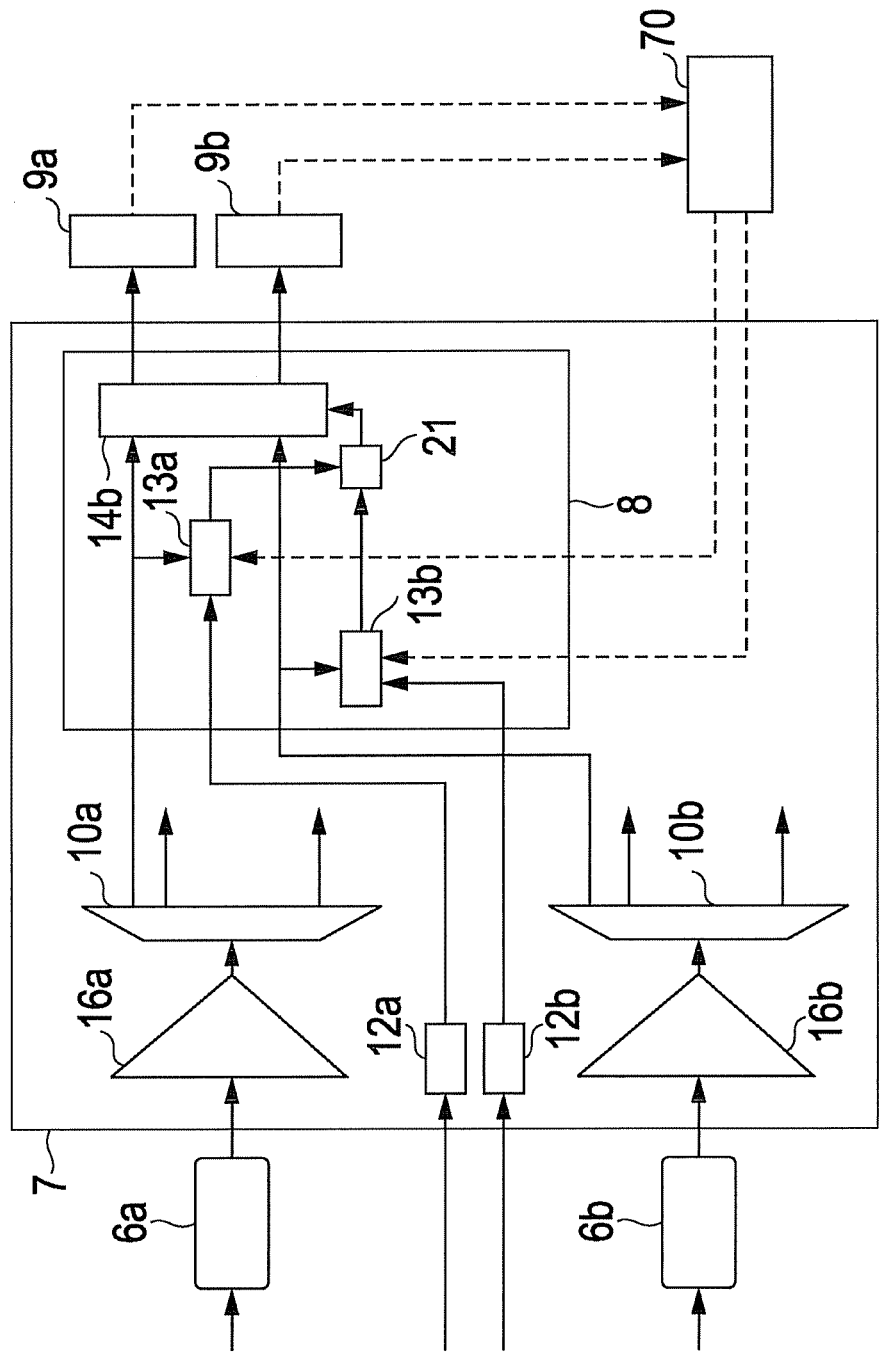
FIG. 11 is a diagram illustrating a configuration of an optical receiving terminal.

FIG. 11 is a diagram illustrating the configuration of an optical receiving terminal. This optical receiving terminal differs from the optical receiving terminal illustrated in FIG. 2 in that a 2×2 switch 14b is used instead of the switch 14, optical receivers 9a and 9b to which two optical outputs of the 2×2 switch 14b are individually transmitted are disposed, and an error determination circuit 70 for determining whether an optical signal has been received using bit error values that are results of demodulation performed by the optical receivers 9a and 9b.

At the time of occurrence of a failure, the 2×2 switch 14b switches between the optical channel corresponding to the first path 6a and the optical channel corresponding to the second path 6b and outputs signals.

The error determination circuit 70 outputs an error determination signal (Bit Err) indicating whether the optical receivers 9a and 9b have received an optical signal transmitted from an optical transmitter. The error determination signal Bit Err is supplied to the optical signal fault detection units 13a and 13b and the line switching control circuit 21 instead of WCF information. In this embodiment, instead of the WCF information illustrated in FIG. 6, the error determination signal Bit Err illustrated in FIG. 6 can be used.

The optical signal fault detection units 13a and 13b store optical power obtained at the time of input of an optical signal using the output of the error determination circuit 70 instead of the WCF information. On the basis of a value that is a predetermined value below the stored power, the determination of a signal fault is performed.

Figure 12A:
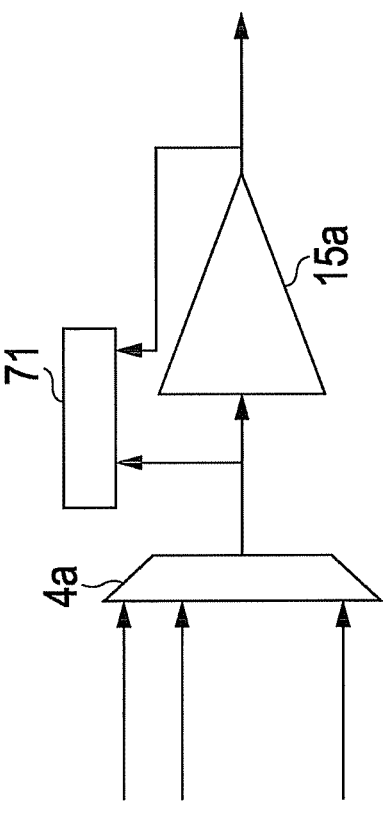
FIGS. 12A and 12B are diagrams describing the detection of an optical channel at an optical transmission terminal.
Figure 12B:
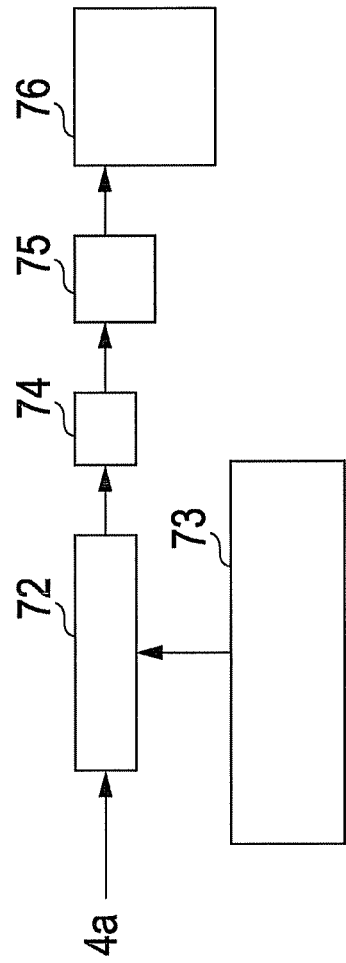

FIGS. 12A and 12B are diagrams describing the detection of an optical channel at an optical transmission terminal. In FIG. 2, the light-receiving elements 80a receive light input into the WDM coupler 4a so as to detect whether an optical signal is present in an optical channel, and the light-receiving elements 80b receive light input into the WDM coupler 4b so as to detect whether an optical signal is present in an optical channel. FIGS. 12A and 12B describe the detection of an optical channel in which a plurality of light-receiving elements are not used.

In FIG. 12A, an optical spectrum analyzer 71 analyzes the output of the WDM coupler 4a, thereby creating the WCF information of an optical channel of each light wavelength. The WCF information created by the optical spectrum analyzer 71 is transmitted by the OSC transmission unit 11a illustrated in FIG. 2. Although the detection of an optical channel has been described using components on the side of the first path 6a, the same processing is performed on the side of the second path 6b.

In FIG. 12B, a light wavelength tunable filter 72 divides the output of the WDM coupler 4a in units of wavelengths of optical channels. More specifically, a driver 73 performs wavelength shifting in accordance with the wavelength of an optical channel.

At a predetermined time, a light-receiving element 74 receives light extracted by the light wavelength tunable filter 72 and converts the light into an electrical signal. An ADC 75 converts the electrical signal transmitted from the light-receiving element 74 into a digital signal. A processor 76 creates WCF information for each optical channel on the basis of a value output from the ADC 75 and transmits the created WCF information to downstream components via the OSC transmission units 11a and 11b.

The above-described embodiments can be combined as necessary.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. An optical communication system comprising:
    an optical transmission terminal comprising:
        a first transmitter for transmitting an optical signal, and
        a second transmitter for transmitting information that includes a wavelength channel service (WCS) array and a wavelength channel failure (WCF) array; and
    an optical receiving terminal comprising:
        an optical receiver for receiving the optical signal and the information transmitted from the first and second transmitter, respectively,
        a storage device for storing a first power value of a first optical signal of the optical signal received by the optical receiver, the first power value of the first optical signal being measured in a timing determined in accordance with the WCS and WCF arrays, and
        a fault detector for detecting fault of a second optical signal of the optical signal by continuously measuring a second power value of the second optical signal received by the optical receiver after the first optical signal and by comparing the second power value with a threshold value which is determined based on the first power value stored in the storage device.

2. The optical communication system of claim 1, further comprising:
    a first optical transmission line for transmitting the optical signal transmitted from the first transmitter;
    a second transmission line for transmitting the information transmitted from the second transmitter;
    an optical amplifier coupled to the first optical transmission line for receiving an optical signal transmitted through the first optical transmission line, and
    a line switching unit for performing line switching between the first optical transmission line and any other transmission line than the first optical transmission line when the fault detector detects the fault of the optical signal,
    wherein, when the fault of the optical signal is detected in the first transmission line, the switching unit switches from the first transmission line to the any other transmission line, and when the fault of the optical signal is detected in the second transmission line, the switching unit switches from the second transmission line to the first transmission line.

3. The optical communication system of claim 1, wherein the storage device stores the second power value after a predetermined period of time has elapsed from a time point at which the information was obtained.

4. The optical communication system of claim 1, wherein the fault detector includes a processor for processing a difference between the second power value and the first power value.

5. The optical communication system of claim 4, wherein the fault detector includes a comparator for comparing an output of the processor with a reference value.

6. An optical receiving terminal for receiving an optical signal transmitted from an optical transmission terminal, comprising:
    an optical receiver for receiving an optical signal and information that includes a wavelength channel service (WCS) array and a wavelength channel failure (WCF) array transmitted from the optical transmission terminal, respectively,
    a storage device for storing a first power value of a first optical signal of the optical signal received by the optical receiver, the first power value of the first optical signal being measured in a timing determined in accordance with the WCS and WCF arrays, and
    a fault detector for detecting fault of a second optical signal of the optical signal by continuously measuring a second power value of the second optical signal received by the optical receiver after the first optical signal and by comparing the second power value with a threshold value which is determined based on the first power value stored in the storage device.

7. The optical receiving terminal of claim 6, further comprising:
    a first optical transmission line for transmitting the optical signal transmitted from the first transmitter;
    a second transmission line for transmitting the information transmitted from the second transmitter;
    an optical amplifier coupled to the optical transmission terminal for receiving the optical signal; and
    a line switching unit for performing line switching between the first optical transmission line and any other transmission line than the first optical transmission line when the fault detector detects the fault of the optical signal,
    wherein, when the fault of the optical signal is detected in the first transmission line, the switching unit switches from the first transmission line to the any other transmission line, and when the fault of the optical signal is detected in the second transmission line, the switching unit switches from the second transmission line to the first transmission line.

8. The optical receiving terminal of claim 6, wherein the storage device stores the second power value after a predetermined period of time has elapsed from a time point at which the information was obtained.

9. The optical receiving terminal of claim 6, wherein the fault detector includes a processor for processing a difference between the second power value and the first power value.

10. The optical receiving terminal of claim 9, wherein the fault detector includes a comparator for comparing an output of the processor with a reference value.

11. An optical signal fault detection method performed by an optical receiving terminal for receiving an optical signal transmitted from an optical transmission terminal, comprising:

receiving an optical signal and information that includes a wavelength channel service (WCS) array and a wavelength channel failure (WCF) array transmitted from the optical transmission terminal, respectively, storing a first power value of a first optical signal of the optical signal received by the receiving, the first power value of the first optical signal being measured in a timing determined in accordance with the WCS and WCF arrays, and detecting fault of a second optical signal of the optical signal by continuously measuring a second power value of the received second optical signal after the first optical signal and by comparing the second power level with a threshold value which is determined based on the first power value of the stored optical signal.

* * * * *